United States Patent

Bhakta et al.

[11] Patent Number: 5,352,428
[45] Date of Patent: Oct. 4, 1994

[54] HIGH CONVERSION AMMONIA SYNTHESIS

[75] Inventors: Mukund L. Bhakta, Whittier; Bernard J. Grotz, Pasadena, both of Calif.

[73] Assignee: C.F. Braun, Inc., Alhambra, Calif.

[21] Appl. No.: 935,130

[22] Filed: Aug. 21, 1992

Related U.S. Application Data

[63] Continuation of Ser. No. 586,755, Sep. 24, 1990, abandoned.

[51] Int. Cl.$^5$ .......................... C01C 1/04; F28D 7/00; B01J 8/02
[52] U.S. Cl. ................................. 423/360; 423/361; 423/354; 423/352; 422/148; 422/198; 422/200; 422/207; 422/211
[58] Field of Search ................................ 422/200, 207

[56] References Cited

U.S. PATENT DOCUMENTS

| | | | |
|---|---|---|---|
| 3,721,532 | 3/1973 | Wright et al. | 423/361 X |
| 3,851,046 | 11/1974 | Wright et al. | 423/359 |
| 4,867,959 | 9/1989 | Grotz | 423/360 |
| 4,907,643 | 3/1990 | Grotz | 165/1 |
| 4,921,684 | 5/1990 | Grotz et al. | 423/360 |

FOREIGN PATENT DOCUMENTS

| | | |
|---|---|---|
| 0113524 | 7/1984 | European Pat. Off. |
| 0248284 | 12/1987 | European Pat. Off. |
| 0268469 | 5/1988 | European Pat. Off. |
| 0272449 | 6/1988 | European Pat. Off. |
| 0273231 | 6/1988 | European Pat. Off. |

OTHER PUBLICATIONS

Wayne A. Glover, Two-Staged Adiabatic Ammonia Synthesis Converter, Aug. 29, 1972.
Ammonia, Part III, A. V. Slack, ed., Marcel Dekker, Inc., New York, 1977 pp. 197-209 and 291-369.
The design of ammonia converters, editors, Nitrogen, No. 110, Nov./Dec. 1982, pp. 30-37.
Exchange of quench?, P. Lesur, Nitrogen, No. 108, Jul./Aug. 1977, pp. 29-32

Primary Examiner—Ferris Lander
Attorney, Agent, or Firm—Lyon & Lyon

[57] ABSTRACT

A process and apparatus are disclosed to achieve high per-pass synthesis conversion of ammonia. A nitrogen/hydrogen synthesis gas mixture is passed sequentially through a plurality of catalyst beds. The effluent from a subsequent catalyst bed is cooled by direct quench with a partially reacted gas which has passed through at least a first catalyst bed.

31 Claims, 4 Drawing Sheets

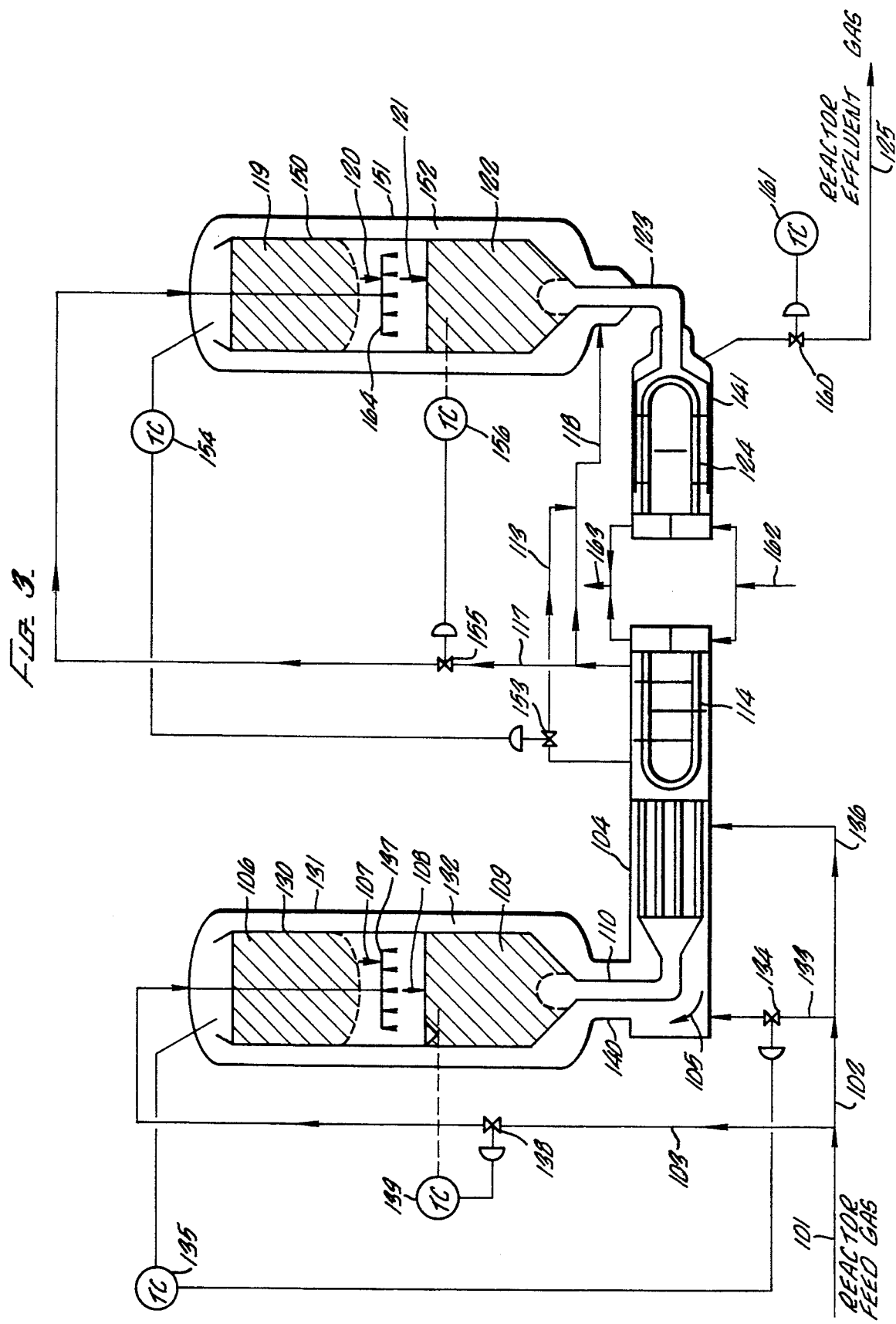

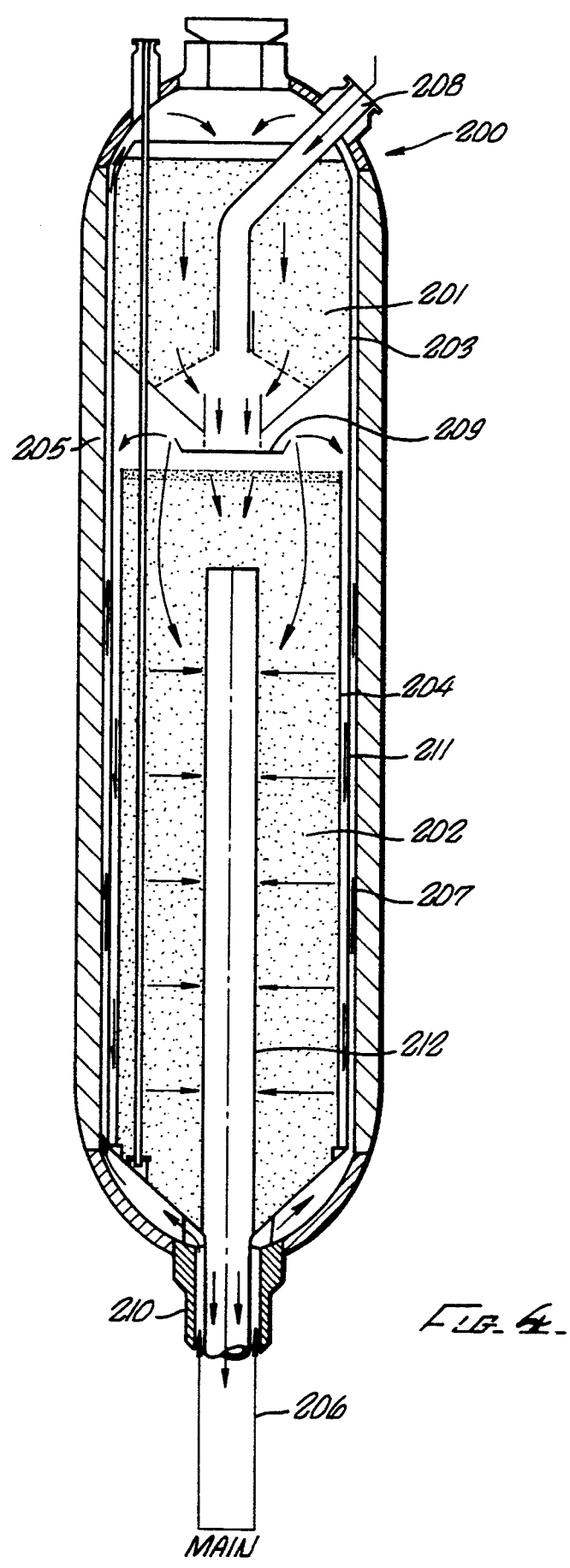

HIGH CONVERSION AMMONIA SYNTHESIS

This is a continuation of co-pending application Ser. No. 07/586,755, filed on Sep. 24, 1990 and now abandoned.

BACKGROUND OF THE INVENTION

1. Field of the Invention

This invention relates to a process and apparatus for the synthesis of ammonia. More particularly, this invention provides higher per-pass conversion of synthesis gas to ammonia, which results in lower recycle gas compression requirement, lower refrigeration requirement, and lower overall plant energy consumption, and, at the same time, substantially lower investment than known processes.

2. Description of the Prior Art

Ammonia is produced commercially by continuous processes which involve the seemingly straightforward reaction between stoichiometric amounts of nitrogen and hydrogen:

$$N_2 + 3H_2 \rightarrow 2\ NH_3.$$

In practicing such processes, a gaseous mixture containing nitrogen and hydrogen is passed sequentially over one or more catalyst beds containing, for example, granular iron or promoted iron catalyst, at elevated pressure and temperature.

The reaction is accompanied by a reduction in gas volume, and equilibrium is therefore shifted to the right as the reaction pressure is increased. Commercial processes are known in which synthesis is carried out over a wide range of pressures, from about 20 to 1000 atmospheres, but most present-day commercial processes employ pressures in range of about 60 to 300 atm.

The reaction is exothermic; therefore, equilibrium is shifted to the right as the reaction temperature is lowered. However, at any given gas composition, the reaction rate velocity constant decreases as the temperature is lowered, so that as a practical matter, the temperature must be maintained at a high enough level to permit the synthesis of acceptable quantities of ammonia product in a reasonably short time. This is true even with acceleration of the reaction rate achieved with a catalyst.

For minimum catalyst volume, the temperature at each point in the catalyst would be controlled at the level at which the reactivity and the equilibrium driving force corresponding to the composition at that point are balanced to achieve the maximum rate of ammonia formation. In such an ideal system, both the temperature and the rate of heat removal would be highest at the inlet of the catalyst, with both gradually decreasing to lower levels at the outlet.

Older commercial processes attempted to approach these conditions for minimum catalyst volume by imbedding indirect heat transfer surfaces throughout the catalyst bed, by which heat could be transferred by indirect heat exchange to a cooling fluid such as incoming feed gas or other cooling media.

It was later discovered, however, especially for larger plants, that as a practical matter the costs of fabrication, maintenance, catalyst loading, and catalyst unloading of such systems were unnecessarily high, and that a more practical and more economical approach is to employ a series of two or more adiabatic beds with successively lower outlet temperatures. Most modern processes employ this approach.

In such processes, as the gaseous mixture passes through each bed, the ammonia concentration increases as hydrogen and nitrogen react. The temperature of the gas is also increased by the exothermic heat of reaction, until the ammonia concentration and temperature approach equilibrium conditions.

To achieve further conversion, the gaseous mixture is withdrawn from the first bed, cooled to a lower temperature at which the equilibrium concentration of ammonia is greater, and then introduced to the second bed, where the phenomena occurring in the first bed are repeated, except at higher ammonia concentration levels and lower outlet temperatures. In many processes, additional beds are employed in the same manner to obtain still greater ammonia concentrations.

Two general methods are used to cool the gas leaving a bed before sending it to another bed. One method is to quench directly the gas leaving a bed by mixing with it a part of the feed gas having a lower temperature, which results in a mixture having a lower temperature than that of the effluent before mixing. When two or more such direct quench steps are used, the cooler feed gas is divided into one part for each quench step and another part which is pre-heated and fed to the first bed. The other interbed cooling method is indirect heat exchange with another fluid.

The preceding comments on interbed cooling do not apply to cooling the effluent from the last bed in the series, which is always done by indirect heat exchange, even when direct quench is used to cool the gas between beds.

A prior art process which has found wide application in large modern plants is described in U.S. Pat. No. 3,851,046 to Wright et al. Two adiabatic beds are used, preferably in two separate reactor vessels, the effluent from the first bed being cooled by indirect heat exchange with feed gas to the first bed.

U.S. Pat. Nos. 4,744,966, and 4,867,959 to Grotz, the disclosures of which are specifically incorporated herein by reference, describe processes using two or more beds, preferably each in a separate reactor, the effluent from each being cooled by indirect heat exchange. The effluent from the first bed is cooled first by indirect heat exchange with the feed to the first bed as in the Wright, et al., patent, and then further cooled by indirect heat exchange with an external high temperature heat sink fluid, such as a steam generator or steam superheater.

Grotz '959 also recites a process in which the first of the two or more beds is a quench type converter. The first bed, preferably in a first separate reactor, is divided into two or more sub-beds, preferably in the same first reactor. The effluent from the first sub-bed is cooled by direct quench with part of the feed gas to the first bed.

Many efforts have been made to increase ammonia concentrations and associated per-pass conversion. Because the flow of circulating gas is roughly inversely proportional to the conversion per pass, many of the equipment and piping sizes in the synthesis loop and the energy required for recycle and refrigeration compression can be reduced roughly in the same proportion when conversion is increased.

Such efforts, however, prior to the present invention, have not resulted in totally satisfactory processes, as will be shown in further detail hereinafter. The need thus exists for a process for synthesizing ammonia at high reactor outlet ammonia concentrations at costs lower than those of known methods.

SUMMARY OF THE INVENTION

This invention is a process and apparatus for achieving high per-pass conversion in the synthesis of ammonia. A synthesis feed gas mixture containing nitrogen and hydrogen is passed sequentially through a plurality of catalyst beds containing ammonia synthesis catalyst. After the gas is partially reacted in at least one bed, the gas is further fed to subsequent beds. The effluent from the first subsequent bed is cooled by direct quench. Contrary to processes of the prior art, the quench gas is not a part of the feed gas, but is a partially reacted gas which has been passed through at least the first bed.

In a preferred embodiment, the feed gas passes through a first bed and then a second bed, the effluent from the first bed being cooled by direct quench with feed gas. The effluent from the second bed is cooled by indirect heat exchange with the feed gas to the first bed and then divided into two streams. One of the two streams is further cooled by indirect heat exchange with a high temperature heat sink fluid, preferably in a high pressure steam generator or steam superheater. The other part of the second bed effluent bypasses the high temperature heat sink exchanger.

The thus further cooled part of the second bed effluent is further divided into two additional streams, one of the two additional streams being combined with the part of the second bed effluent which bypassed the high temperature heat sink exchanger, thereby forming the feed to a third bed. The temperature of the feed to the third bed is maintained at the desired level by adjusting the amount of gas bypassing the high temperature heat sink exchanger.

The other additional part of the further cooled second bed effluent is bypassed around the third bed and is combined with the effluent of the third bed to form the feed to a fourth bed. The temperature of the feed to the fourth bed is controlled by adjusting the amount of gas which bypasses the third bed. The effluent from the third bed is thus cooled by direct quench. The effluent of the fourth bed is cooled by indirect heat exchange, also preferably with a high temperature heat sink.

It is accordingly a principal object of this invention to provide a novel continuous process and apparatus for synthesizing ammonia in which high per-pass conversion is achieved.

It is also an object of this invention to provide a novel continuous process and apparatus for synthesizing ammonia in which the ammonia conversion is increased, compared to known processes, resulting in lower overall ammonia plant investment and energy costs.

These and other objects, as well as the nature, scope and utilization of the invention, will become readily apparent to those skilled in the art from the following description, the drawings and the appended claims.

BRIEF DESCRIPTION OF THE DRAWINGS

FIG. 3 is a schematic illustration of an alternative embodiment of apparatus for carrying out the process of this invention.

FIG. 4 is an illustration in cross-section of an axial-radial flow reactor suitable for use in the apparatus and process of this invention.

DETAILED DESCRIPTION OF THE INVENTION

Figure 1:
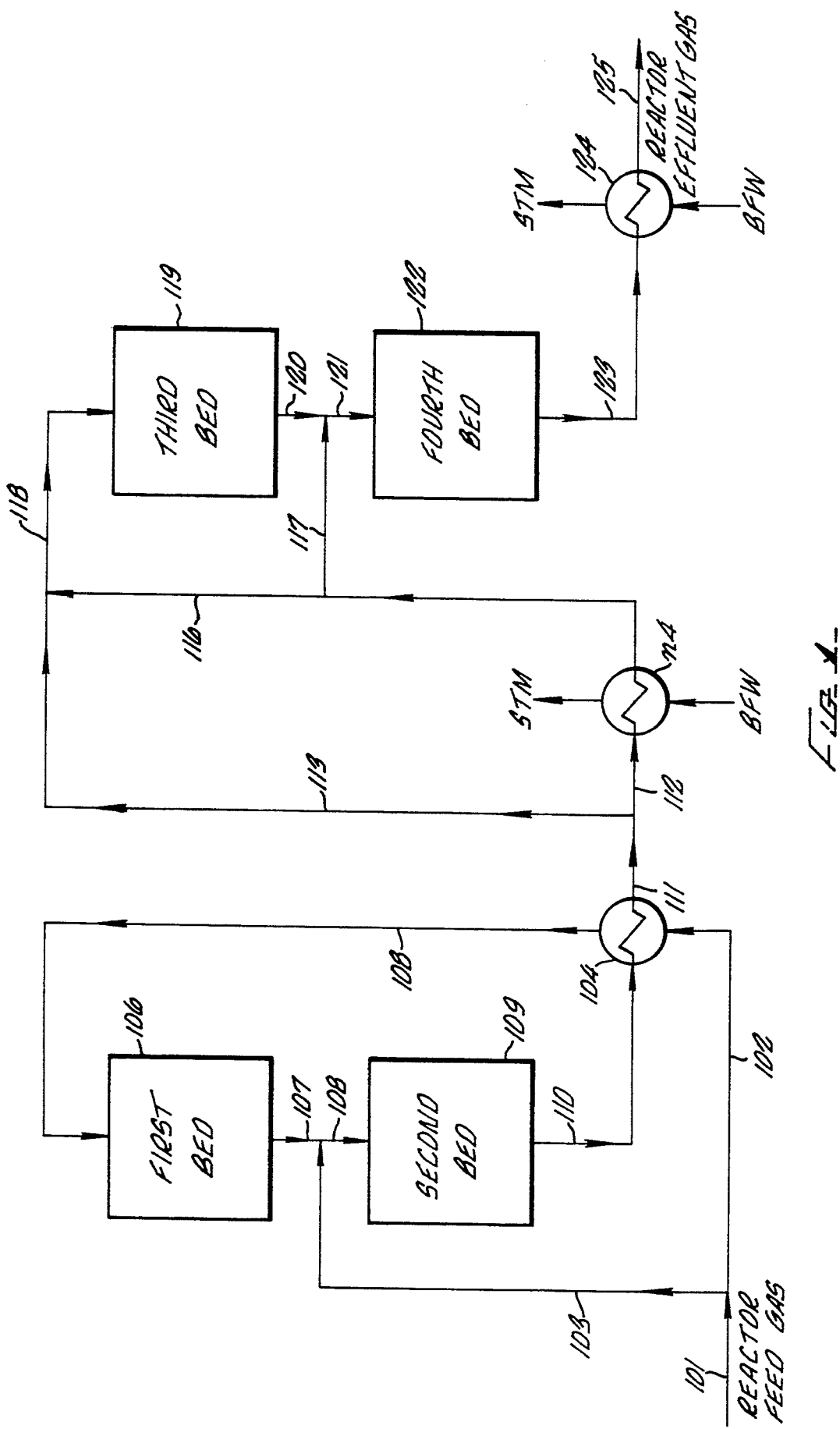
FIG. 1 is a schematic illustration of a preferred embodiment of the process of the present invention.

Referring to FIG. 1, ammonia synthesis reactor feed gas containing hydrogen and nitrogen in a three to one volume ratio, 4.0% inert gases, and 3.5% ammonia, and having a pressure of about 150 atm., is introduced into the system through conduit 101 at a temperature of 280° C. Conduits 102 and 103 divide the feed gas into two parts, the first part being passed through conduit 102 to heat exchanger 104 and heated therein to a temperature of 380° C. The thus-heated gas is then passed through conduit 105 to the first catalyst bed 106, in which the ammonia concentration increases to 11.7% and the exothermic heat of the ammonia-forming reaction causes the temperature to rise to 512° C.

The partially converted gas leaves catalyst bed 106 through conduit 107 and is combined and mixed, i.e., quenched, with the second part of the feed gas from conduit 103 in conduit 108, resulting in a temperature of the combined gases after mixing of 380° C. The combined gases are passed to a second catalyst bed 109, where again the ammonia concentration increases, this time to 14.1%, the heat of reaction causing a temperature rise in the gas to 491° C. The further partially converted gas leaving second catalyst bed 109 through conduit 110 is cooled in heat exchanger 104 to a temperature of 434° C.

The thus-cooled gas leaves exchanger 104 through conduit 111 and is divided into two parts, the first part being passed through conduit 112 to a high pressure steam generator 114, where heat is recovered from the gas by indirect heat transfer to water boiling at 100 atmospheres and 312° C., thereby cooling the gas to 323° C. The thus-cooled gas leaves heat exchanger 114 through conduit 115. The gas in conduit 115 is divided into two parts, the first part being passed through conduit 116 and mixed with gas from conduit 113 in conduit 118, resulting in a temperature of the combined gases after mixing of 380° C., at which the combined gases are passed into a third catalyst bed 119, where the ammonia concentration increases to 19.2%, the heat of reaction causing the temperature in the gas stream to rise to 453° C.

The partially converted gas leaves catalyst bed 119 through conduit 120 and is combined and mixed, i.e., quenched, with the gas from conduit 117 in conduit 121, resulting in a temperature of the combined gases after mixing of 380° C. The combined gases are passed to a fourth catalyst bed 122, where the ammonia concentration increases, this time to 21.0%, the heat of reaction causing the temperature in the gas to rise to 443° C.

The still further partially converted gas leaving fourth catalyst bed 122 through conduit 123 is cooled in a second high pressure steam generator 124, where additional heat is recovered as in first high pressure steam generator 114, thereby again cooling the gas to 323° C. The thus-cooled reactor effluent gas is then passed through conduit 125 to additional known processing steps, not shown, for further recovery of heat and for separation of ammonia product from the gas, after which the remaining gas is recycled and combined with fresh makeup gas to form the reactor feed gas.

To demonstrate the significantly improved results achieved by the process of this invention, Case Studies A through D are presented, comparing this invention to the prior art.

The outlet ammonia concentrations of the processes of the Wright, et al. and Grotz patents, identified previously herein, have been compared on the following basis. In each case, two reactors are employed, and the following conditions are the same. The pressure in the beds is 150 atmospheres. The feed gas is a mixture of three parts hydrogen to one part nitrogen by volume containing 3.5% ammonia and 4.0% inert gases and having a temperature of 280° C., all concentrations herein expressed as percent by volume. Each bed is an adiabatic bed having a gas inlet temperature of 380° C., which is reached by indirect transfer of heat from hot effluent gas to the 280° C. inlet gas. The effluent from each bed has an approach to equilibrium of 5° C., i.e., the ammonia concentration corresponds to the equilibrium concentration at a temperature 5° C. above the actual temperature. All of these conditions are typical and optimum in many commercial process designs.

Case A is the process of the Wright, et al., U.S. Pat. No. 3,851,046. In this case, the entire system from the 280° C. inlet to the feed effluent exchanger to the outlet of the final bed is adiabatic, since there is no heat transfer to or from the system from or to an external source or sink. The ammonia concentration and temperature of the final effluent, therefore, lie on an adiabatic reaction path which starts with the 280° C. and 3.5% feed condition. On this path, at the 5° C. approach to equilibrium, the final ammonia concentration in this example is 16.1%. This is the outlet concentration regardless of the path of the temperatures and concentrations at intermediate points within the system.

Case B is the system of Grotz U.S. Pat. No. 4,744,966, which eliminates the restriction of the adiabatic reaction path by introducing an external high temperature heat sink after the first bed feed-effluent exchanger of Wright, et al. to further cool the first bed effluent, thereby permitting the temperatures of the feeds to both beds to be controlled independently of one another at their optimum levels, in this case both at 380° C. The outlet ammonia concentration is thereby raised to 17.5%.

Case C is the system of Grotz U.S. Pat. No. 4,867,959 with the catalyst in the first reactor divided into two beds, the effluent from the first bed being cooled by the introduction of part of the feed gas. In this system, the outlet ammonia concentration is further raised to 19.2%.

An alternative embodiment of Grotz '966 provides a means for further increases in outlet ammonia concentration by adding a third reactor following recovery of heat and cooling the second reactor effluent to third reactor inlet temperature by indirect heat exchange with a high temperature heat sink fluid. The addition of a third high pressure reactor with its associated exchangers and piping, however, entails additional investment costs which it is preferable to avoid.

The additional high temperature heat sink exchanger and catalyst bed of the alternative embodiment described in the preceding paragraph could be incorporated into the same reactor vessel with the preceding bed. This, however, would require adapting the heat exchanger geometry to the reactor requirements, providing a means of passing an additional heat sink fluid into and out of the pressure shell and providing an internal means of controlling the flow through the exchanger and the control bypass. All of this would entail additional mechanical design complexity, higher investment costs, more complex maintenance procedures, and higher maintenance costs, which also preferably are avoided.

Case D, using the preferred embodiment of the present invention described above, has been evaluated on the same basis as Cases A, B, and C described previously. The resulting outlet ammonia concentration is 21.0%. This significant increase over the 19.2% of case C, the highest of the three prior art cases, is achieved with substantially less investment than would be required to achieve a similar increase in ammonia concentration by adding a third reactor and another heat sink exchanger. Alternatively, the high costs of incorporating into the second reactor another heat sink exchanger, a means for carrying a heat sink fluid into and out of the reactor, and an internal means for controlling the split of the second bed effluent are also avoided.

Normally, process designers have either put all beds and interbed exchangers in one shell or each bed and exchanger in a separate shell. In this invention, however, it is particularly advantageous to combine the first and second beds in a first reactor vessel, to combine the third and fourth beds in a separate second reactor vessel, and to position the exchangers outside the reactor vessels. This arrangement greatly simplifies the reactor designs, while limiting the number of separate reactors to two. At the same time it permits the exchanger geometry to be optimized independently of the dimensional requirements of the reactors.

Furthermore, the process lends itself particularly well to combining in a single pressure shell the first bed feed-effluent exchanger and the heat sink exchanger following the first bed feed-effluent exchanger as described in U.S. Pat. No. 4,907,643, or combining in a single pressure shell the heat sink exchangers ahead of and following the second reactor vessel as described in U.S. patent application of Bernard J. Grotz, et al., entitled "Apparatus for Ammonia Synthesis" (Ser. No. 07/586,760), filed concurrently herewith, thereby reducing the costs of interconnecting piping and exchanger heads.

While a preferred embodiment of the process of the present invention has thus been described, many changes and modifications in the preferred embodiment may be undertaken and would be within the skill of the art working from the disclosure of the present invention. For example, and without intending to be limiting or all inclusive, it is specifically contemplated that other embodiments of the invention may include the following.

The pressure of the system may be more than 50 atm., preferably from about 125 to approximately 175 atm. The ratio of hydrogen to nitrogen in the reactor feed gas is about 1.5 to approximately 4.0, preferably about 2.5 to about 3.5. The temperature of the reactor feed gas entering the first exchanger is about 250° C. to about 320° C., preferably about 270° C. to about 305° C. The temperature of the gas entering any adiabatic catalyst bed is from about 350° C. to about 400° C., preferably about 370° C. to about 390° C. The temperature of the gas leaving any adiabatic catalyst bed is between approximately 410° C. to about 540° C., preferably about 420° C. to about 530° C. The approach to equilibrium in any catalyst bed is 0° C. to 30° C. and preferably 1° C. to 10° C.

The concentration of inert gases in the reactor feed gas is 0% to 25%, depending on the inerts in the fresh makeup gas and system operating conditions. The concentration of ammonia in the reactor feed gas is 0% to 10%, preferably 3% to 5%. A high temperature heat sink exchanger generates high pressure steam at a pressure of from about 40 to about 160 atm., preferably at about 100 to about 125 atm., or superheats high pressure steam, or heats feedwater to high pressure steam generators. The reactor effluent gas leaving the second high temperature heat sink exchanger 124 is passed to one or more additional adiabatic catalyst beds. Additional beds may be added between the first and second beds, and/or between the third and fourth beds of FIG. 1, the effluents from the additional beds also being cooled by direct quench.

The first bed, the second bed, and the first heat exchanger may be replaced with any known ammonia synthesis system for partial conversion of synthesis gas to ammonia. For example, the system starting with the second bed effluent after it leaves the heat exchanger can be installed downstream of an existing converter in an existing plant to achieve an increase in conversion per pass, as part of an expansion in capacity or energy reduction program.

The term "adiabatic bed", as used herein, means each zone of catalyst between any two places in the catalyst where a significant amount of either heat or gas is added or removed, each such zone being considered a separate adiabatic bed. Leakage or other minor or incidental transfer of either heat or gas, as for example heat loss through a catalyst containment wall, or minor or incidental portions of catalyst not within such a zone, are disregarded for the purpose of defining a separate adiabatic bed. Whether a given bed is divided into two or more parallel beds operating at about the same conditions is also disregarded.

In some processes, all the catalyst beds and all the devices for cooling the gases leaving the beds are contained in a single pressure vessel. In other processes, each bed and each cooling device is contained in a separate pressure vessel. And in still other processes, at least one of two or more pressure vessels may contain a combination of two or more of these components. The term adiabatic catalyst bed, as thus defined, applies without regard as to whether any particular combination of catalyst beds and cooling devices is located in the same pressure vessel, and without regard to whether two adiabatic beds are separated physically by means such as a catalyst support device and/or a gas space, or are simply two zones of a catalyst body in which a gas transfer device or a heat transfer device is embedded.

The term "conduit" as used herein, refers to any fluid passage, without regard to whether it is a duct, a pipe, a passage between two catalyst beds that are physically separated within a pressure vessel, or the catalyst interstices through which the gas passes between adiabatic beds, as defined above, which are not physically separated.

Figure 2:
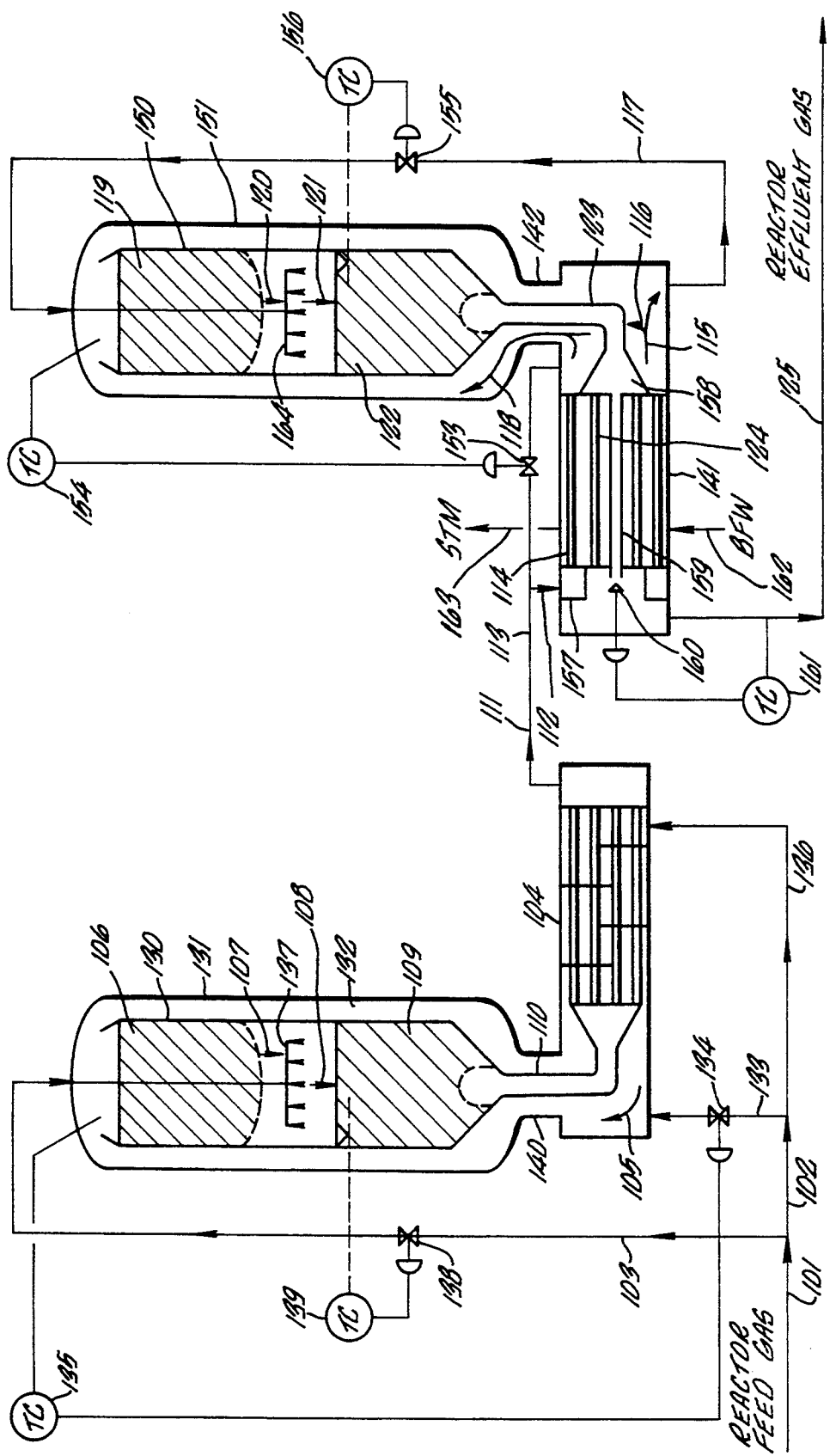
FIG. 2 is a schematic illustration of a preferred apparatus for carrying out the process shown in FIG. 1.

FIG. 2 shows a preferred embodiment of apparatus for carrying out the process of FIG. 1. The first and second catalyst beds 106 and 109 are contained in a first catalyst holder 130, which in this embodiment is disposed in a first reactor pressure shell 131, in a manner such as described in U.S. Pat. No. 3,721,532 of Wright et al, the disclosure of which is specifically incorporated herein by reference. The feed gas in conduit 105 flows upward through an annulus 132 between pressure shell 131 and first catalyst holder 130, thereby shielding pressure shell 131 from the higher temperatures of the reacting gases. The feed gas then enters the top of the first catalyst bed 106 and flows downward through the first and second catalyst beds 106 and 109 in series.

The desired temperature of the feed to the first catalyst bed 106 is maintained by a first temperature control means in which a part of the reactor feed gas in conduit 102 is bypassed around heat exchanger 104 through conduit 133 and control valve 134, which is continually adjusted by temperature controller 135 to maintain the feed gas to the first catalyst bed 106 at the desired temperature. The main part of the gas from conduit 102 is passed through conduit 136 to exchanger 104.

The quench gas in conduit 103 is passed through the top of shell 131 and first catalyst bed 106 to quench gas distributor 137 disposed between the first and second catalyst beds 106 and 109 for distributing the quench gas across the cross section of the catalyst holder 130 and for mixing the quench gas from conduit 103 with effluent from first catalyst bed 106 in conduit 107 to form in conduit 108 the feed gas to the second catalyst bed 109.

The desired temperature of the feed to second catalyst bed 109 is maintained by a second temperature control means in which the quench gas in conduit 103 is passed through control valve 138, which is continually adjusted by a temperature controller 139 to maintain the feed gas to the second catalyst bed 109 at the desired temperature.

Heat exchanger 104 is close-coupled to the bottom ends of the first catalyst holder 130 and the first pressure vessel 131 in a manner such as that described in U.S. Pat. Nos. 4,554,135 and 4,921,684 of Grotz, et al., the disclosures of which are specifically incorporated herein by reference, by close coupling means 140.

High temperature heat sink exchangers 114 and 124 are both high pressure steam generators and are combined in a single exchanger pressure shell 141 in a manner such as that shown in U.S. patent application of Bernard J. Grotz, et al., entitled "Apparatus For Ammonia Synthesis" (Ser. No. 07/586,760), filed concurrently herewith, the disclosure of which is specifically incorporated herein by reference. The tubes of exchanger 114 are disposed around the periphery of shell 141 forming a hollow bundle of tubes. The tubes of exchanger 124 are disposed in an interior region of shell 141 inside the hollow bundle formed by the tubes of exchanger 114. Exchangers 114 and 124 and shell 141 are also close-coupled to a second catalyst holder 150 and a second reactor pressure shell 151 by close-coupling means 142. Catalyst holder 150 contains the third catalyst bed 119 and fourth catalyst bed 122 and is disposed inside shell 151, also in a manner such as that described in the Wright, et al. '532 patent.

The temperature of the feed gas to the third catalyst bed 119 is controlled by a third temperature control means in which a part of the second bed effluent from conduit 111 is bypassed around exchanger 114 through conduit 113. The remainder of the gas passes through conduit 112 to exchanger 114. A control valve 153 is continually adjusted by a temperature controller 154 to maintain the temperature of the feed gas to the third bed in conduit 118 at the desired level. A part of the gas from the tubes of exchanger 114 is mixed with the gas from bypass conduit 113 to form the feed to the third bed in conduit 118.

The temperature of the feed gas to the fourth catalyst bed 122 is controlled by a fourth temperature control means in which a part of the effluent from exchanger 114 in conduit 115 is bypassed around the third catalyst bed 119 through conduit 117. A control valve 155 is continually adjusted by temperature controller 156, to maintain the temperature of the feed gas to the fourth bed at the desired level. The gas from conduit 117 is mixed with the gas leaving the third bed through conduit 120 by quench gas distributor 164.

The effluent from fourth catalyst bed 122 is passed successively through conduit 123 of the close-coupled connection, the tubes of exchanger 124, and conduit 125 out of shell 141.

A flanged ring partition 157, disposed in the end of shell 141 away from the close coupled end, separates the cooled second bed effluent stream entering the tubes of exchanger 114 from conduit 112 from the cooled fourth bed effluent stream leaving the tubes of exchanger 124 in conduit 125. A conical connector 158, disposed in the close-coupled end, separates the third bed feed gas leaving the tubes of exchanger 124 in conduit 115 from fourth bed effluent gas entering the tubes of exchanger 114 from conduit 123. A part of the fourth bed effluent gas from conduit 123 is bypassed around exchanger 124 through a single pipe 159, positioned along the center axis of exchanger bundle 124. A conical plug 160, positioned at the outlet of bypass pipe 159, serves as a control valve and is continually adjusted by a temperature controller 161 to maintain the temperature of reactor effluent gas in conduit 125 at the desired temperature. In the embodiment of FIG. 2, the bypass system for exchanger 124 is optional. If the gas in conduit 125 is to go directly to another catalyst bed, however, a means such as the bypass system is needed to control the temperature of the feed to the next catalyst bed.

Boiler feedwater is introduced through conduit 162 into shell 141, and high pressure steam is passed out of shell 141 through a conduit 163 into a steam system, not shown.

While a preferred embodiment of the apparatus of the present invention has thus been described, several changes and modifications in the preferred embodiment may be made and would be within the skill of the art working from the disclosure of the present invention. For example, and without intending to be limiting or all inclusive, it is specifically contemplated that other embodiments of the invention may include the following:

Combining high temperature heat sink exchangers 114 and 124 is optional. They may be installed in separate shells.

As illustrated in FIG. 3, heat exchangers 104 and 114 may be combined in a single shell in a manner such as that described in Grotz et al. U. S Pat. No. 4,907,643, the disclosure of which is specifically incorporated herein by reference. In that case, the gas flow in exchange 114 is in the shell and the high-temperature heat sink fluid is in the tubes. Heat exchanger 124 is in a separate shell; for example, in the manner shown and described in Parnkopf, et al., U.S. Pat. No. 4,010,797, the disclosure of which is specifically incorporated by reference.

FIG. 2 shows axial flow through all beds. Alternatively, flow could be directed radially through each bed, or a combination of axially through one or more beds and radially through one or more other beds, and/or part of the gas to one or more beds could enter that bed axially and part radially, the two parts being combined within the bed, the combined parts leaving the bed in an axial direction. U.S. Pat. No. 4,372,920 of Zardi describes a reactor containing two or more beds, each of which has part axial and part radial flow. FIG. 4 illustrates a preferred embodiment, however, in which the flow into the first bed is axial only, and the flow into the second bed is partly axial and mostly radial.

The main purpose of radial flow is to reduce pressure drop. Disadvantages are greater mechanical complexity, plus poorer distribution and poorer mass transfer that result from lower velocities. We have discovered that, in the first bed, where the gas flow rate and bed depth are much less than in the bottom bed, the pressure drop saving is small, and better performance is obtained with axial flow only, whereas in the larger second bed with more gas, partial radial flow is often justified.

In FIG. 4, a reactor 200, in which flow to the lower bed is partly axial and partly radial, is illustrated which may be used in this invention in place of either or both of the reactors shown in FIGS. 1-3.

Reactor 200 includes first and second catalyst beds 201 and 202 contained in catalyst holder 203 in a high pressure shell 205. The feed gas enters through conduit 206 and flows upwardly through annulus 207 between shell 205 and catalyst holder 203, through the open top of catalyst holder 203, and into and through first catalyst bed 201. Quench gas is introduced into the system through conduit 208 and provides direct quench to the effluent from catalyst bed 201 by quench distributor 209, as illustrated. Catalyst bed 202 is separated from catalyst holder 203 by a perforated wall 204, which provides an annular passage 211 between catalyst holder 203 and perforated wall 204. The quenched feed gas mixture from catalyst bed 201 and quench gas distributor 209 flow into catalyst bed 202, partly through the perforations in perforated wall 204 and partly through the opening at the top of perforated wall 204, and then through catalyst bed 202. The reacted gas leaves catalyst bed 202 through perforated collector pipe 212 and exits the reactor through conduit 210.

Other configurations of the systems for controlling the inlet temperature of each bed may be used. For example, if heat manner described in the Grotz '643 patent, wherein the gas from conduit 111 flows into the shell side of exchanger 114, the temperature of third bed 119 could be controlled by passing all of the gas into exchanger 114, but withdrawing part of the gas from an intermediate point in the shell of exchanger 114 to bypass the downstream portion of exchanger 114.

The quench gas distributor 137 and/or 164 could be replaced by other quench gas means which will allow the second part of the feed gas to quench the effluent gas from the first catalyst bed. Thus, by way of example only, the quench gas might not be distributed across the entire cross section of catalyst holder 130 and/or 150. The upper beds may or may not be separated from the lower beds by a support for the upper bed. Without a support, the distributor would simply be imbedded in a catalyst zone at the boundary of the two beds. Further, conduit 103 and/or 117 might pass the quench gas through a side of shell 131 and/or 151, and it might or might not pass through the first catalyst bed 106 or 119.

It will be readily apparent to those skilled in the art that still further changes and modifications in the actual implementation of the inventions described herein can readily be made without departing from the spirit and scope of the invention as defined by the following claims. Accordingly, the scope of the invention should not be limited, except as set forth by the lawful scope of the following claims.

We claim:

1. In a continuous ammonia synthesis process in which a synthesis gas mixture containing nitrogen and hydrogen is passed sequentially through three or more catalyst beds to produce a gaseous effluent from each of the catalyst beds containing ammonia and unreacted nitrogen and hydrogen, the improvement comprising passing a portion of the partially reacted synthesis gas which has passed through at least a first catalyst bed to a first subsequent catalyst bed, directly quenching the effluent from said first subsequent catalyst bed with partially-reacted synthesis gas which has passed through at least said first catalyst bed, and passing said quenched effluent through a second subsequent catalyst bed to form a gas stream of increased ammonia concentration.

2. The process of claim 1 in which said synthesis gas is passed through two catalyst beds prior to being passed to said first subsequent catalyst bed.

3. The process of claim 2 in which said partially-reacted synthesis gas undergoes indirect heat exchange prior to being passed to said first subsequent catalyst bed.

4. The process of claim 3 in which at least a portion of said partially-reacted synthesis gas undergoes a second indirect heat exchange step prior to being passed to said first subsequent catalyst bed.

5. The process of claim 1 in which at least a portion of said partially-reacted gas is cooled by heat exchange with said synthesis gas mixture and at least a portion of said partially-reacted gas thereafter is further cooled by indirect heat exchange.

6. The process of claim 5 in which said second indirect heat exchange is a high-temperature heat sink exchange in which high pressure steam is generated at a pressure of about 40 to about 160 atmospheres.

7. The process of claim 6 in which high pressure steam is generated at a pressure between approximately 100 to about 125 atmospheres.

8. The process of claim 5 in which said second indirect heat exchange step superheats high-pressure steam.

9. The process of claim 5 in which at least a portion of said partially-reacted gas, following said indirect heat exchange with said synthesis gas mixture and further cooling by indirect heat exchange, is combined with said effluent of said first subsequent catalyst bed to quench directly said effluent from said first subsequent catalyst bed.

10. The process of claim 5 in which the effluent of the second subsequent catalyst bed, a portion of which is cooled in an additional high-temperature heat sink exchanger, is fed to a third subsequent synthesis reactor, said reactor having a third subsequent catalyst bed and a fourth subsequent catalyst bed, the feed to the fourth subsequent catalyst bed being a quenched mixture of the effluent of the third subsequent catalyst bed and the cooled effluent of the second subsequent catalyst bed.

11. The process of claim 1 in which the feed gas to said synthesis process is introduced at a pressure between about 125 to about 175 atmospheres.

12. The process of claim 1 in which the ratio of hydrogen to nitrogen in the feed gas to said synthesis process is about 1.5 to about 4.0.

13. The process of claim 12 in which the ratio of hydrogen to nitrogen in said feed gas is about 2.5 to approximately 3.5.

14. The process of claim 1 in which the temperature of the partially reacted synthesis gas entering said first subsequent catalyst bed is within the range of about 350° C. to about 400° C.

15. The process of claim 14 in which the temperature of said partially reacted synthesis gas is between about 370° C. and 390° C.

16. The process of claim 1 in which the temperature of the partially reacted synthesis gas leaving said first subsequent catalyst bed is between approximately 410° C. and about 540° C.

17. The process of claim 16 in which the temperature of said partially reacted synthesis gas is between about 420° C. to about 530° C.

18. A system of apparatus for the synthesis of ammonia, comprising a first synthesis reactor system and a subsequent synthesis reactor, the subsequent synthesis reactor comprising a reactor shell having an inlet and an outlet and first and second catalyst beds contained in a catalyst holder positioned within and spaced from the reactor shell, to provide an annulus between said catalyst holder and said reactor shell to allow feed gas to enter the first catalyst bed; means for passing the effluent gas from the first catalyst bed into the second catalyst bed; a high-temperature heat sink exchanger comprising an exchanger shell having disposed therein a first high-temperature heat sink tube bundle and a second high-temperature heat sink tube bundle disposed in an interior portion of said exchanger shell inside of said first tube bundle; means for close-coupling the inlet and outlet of said subsequent reactor to said exchanger, said close-coupling means having a first conduit between said annulus and said first tube bundle for passage of feed gas to said first catalyst bed and a second conduit to pass effluent from said second catalyst bed to said second tube bundle; means for passing at least a portion of the effluent gas from the first synthesis reactor system to the inlet of the first tube bundle; means for passing a portion of the gas from the first tube bundle to combine with the effluent gas from the first catalyst bed to provide a direct quench for the effluent from the first catalyst bed, prior to the effluent entering said second catalyst bed.

19. The system of claim 18 in which said first synthesis reactor system comprises a reactor comprising a reactor shell having an inlet and an outlet and first and second catalyst beds contained in a catalyst holder positioned within and spaced from the reactor shell, to provide an annulus between said catalyst holder and said reactor shell to allow feed gas to enter the first catalyst bed; means for passing the effluent gas from the first catalyst bed into the second catalyst bed; a heat exchanger for transferring heat from the effluent of the second catalyst bed to the feed to the first catalyst bed; means close-coupling the inlet and outlet of the reactor to said heat exchanger; and means for passing the effluent of said second catalyst bed, which has passed through said heat exchanger, to the inlet of said first tube bundle.

20. The system of apparatus of claim 19 in which the reactor in said first synthesis reactor system is an axial-radial flow reactor.

21. The system of apparatus of claim 18 in which said second high-temperature heat sink exchanger comprises an exchanger shell having disposed therein a first high-temperature heat sink tube bundle and a second high-temperature heat sink tube bundle disposed in an interior portion of said exchanger shell inside of said first tube bundle.

22. The system of apparatus of claim 18 in which said second high-temperature heat sink exchanger is connected to said second reactor by means close-coupling the inlet and outlet of said second reactor to said second heat exchanger, said close-coupling means having a first conduit between said annulus of said second reactor and said first tube bundle of said second heat exchanger for passage of feed gas to said catalyst bed and a second conduit to pass effluent from said catalyst bed to said second tube bundle.

23. The system of apparatus of claim 18 in which said synthesis reactors are vertical and said exchanger shell or shells are disposed horizontally with respect to said reactor shells.

24. The system of apparatus of claim 18 further including a bypass system for said heat sink exchanger to control the temperature of the gas entering said first catalyst bed of said subsequent synthesis reactor.

25. The system of apparatus of claim 18 further including means for bypassing part of the effluent from said heat sink exchanger around said first subsequent catalyst bed of said subsequent synthesis reactor to combine with the effluent from said first catalyst bed of said subsequent synthesis reactor as quench.

26. The system of apparatus of claim 25 in which means are operatively connected to said bypass means for controlling the temperature of the feed gas to the second catalyst bed of said subsequent synthesis reactor.

27. The system of apparatus of claim 18 in which the flow of gas into the second bed of said subsequent synthesis reactor is partly axial and partly radial.

28. A system of apparatus for the synthesis of ammonia, comprising a first synthesis reactor system and a subsequent synthesis reactor, said subsequent synthesis reactor comprising a reactor shell having an inlet and an outlet and first and second catalyst beds contained in a catalyst holder positioned within and spaced from said reactor shell, to provide an annulus between said catalyst holder and said reactor shell to allow feed gas to enter said first catalyst bed, means for passing the effluent gas from said first catalyst bed into said second catalyst bed, a high-temperature heat sink exchanger operatively connected to said outlet of said subsequent synthesis reactor to receive the effluent from said second catalyst bed, said high-temperature head sink exchanger comprising an exchanger shell having disposed therein a high-temperature heat sink tube bundle, and said first synthesis reactor system comprising a reactor having a reactor shell with an inlet and an outlet, a first heat sink exchanger operatively connected to said reactor outlet for transferring heat from the effluent from said second catalyst bed to the feed to said first catalyst bed, said first heat exchanger also operatively connected to a high-temperature heat sink exchanger, said high-temperature heat sink exchanger comprising an exchanger shell having disposed therein a high-temperature heat sink tube bundle, means for passing at least a portion of the effluent gas from said synthesis reactor through said first heat exchanger to the inlet of said tube bundle, means for passing a portion of the gas from said tube bundle to combine with the effluent gas from said first catalyst bed in said subsequent synthesis reactor to provide a direct quench for the effluent from said first catalyst bed, prior to said effluent entering said second catalyst bed.

29. The system of apparatus of claim 28 in which said reactor in said first synthesis reactor system further includes first and second catalyst beds contained in a catalyst holder positioned within and spaced from the reactor shell, to provide an annulus between said catalyst holder and said reactor shell to allow feed gas to enter said first catalyst bed, means for passing the effluent from said first catalyst bed into said second catalyst bed, and means for close-coupling the inlet and outlet of said reactor to said first heat exchanger.

30. The system of apparatus of claim 29 in which the reactor in said first synthesis reactor system is an axial-radial flow reactor.

31. The system of apparatus of claim 28 in which the flow of gas into the second bed of said subsequent synthesis reactor is partly axial and partly radial.

* * * * *